Aug. 25, 1959 O'DELL O'KELLEY 2,900,638
APPARATUS FOR DRIVING JOINT NAILS
Filed March 23, 1954 3 Sheets-Sheet 1

O'Dell O'Kelley
INVENTOR.

BY

Aug. 25, 1959   O'DELL O'KELLEY   2,900,638
APPARATUS FOR DRIVING JOINT NAILS
Filed March 23, 1954   3 Sheets-Sheet 2

O'Dell O'Kelley
INVENTOR.

Aug. 25, 1959   O'DELL O'KELLEY   2,900,638
APPARATUS FOR DRIVING JOINT NAILS
Filed March 23, 1954   3 Sheets-Sheet 3

O'Dell O'Kelley
*INVENTOR.*
BY *Mel R. Porter*

United States Patent Office 2,900,638
Patented Aug. 25, 1959

2,900,638
APPARATUS FOR DRIVING JOINT NAILS

O'Dell O'Kelley, Candler, N.C.

Application March 23, 1954, Serial No. 418,137

10 Claims. (Cl. 1—149)

This invention relates to driving machines and more particularly to a pneumatically actuated machine for driving a fastening member into two pieces to be connected together. In its more limited aspects the present invention relates to a machine for pneumatically driving a clamp nail or joint nail into two work pieces for the purpose of fastening them together.

Various machines are known which feed and/or drive nails, staples, and other fastening devices into members which it is desired to connect together. Notwithstanding the existence of these machines a great volume of work in connection with the driving of nails continues to be done manually.

This is particularly true in the furniture and woodworking industries where the fastening devices must be driven into the work pieces with great accuracy and skill. In the building of furniture there is often utilized a special type nail called a clamp nail or joint nail. Such a nail as known in the art and as referred to herein is comprised of a flat body portion which has a sharpened edge at one end and which is slightly wider at the end with the sharp edge than at the other. Along each side of the body portion there extends a rib or flared flange which runs at a right angle with respect to the surface of the body portion. When this nail is driven into the matched edges of two pieces of wood, for example, the two pieces are drawn closely together by a clamping action and thereafter held in that position by the imbedded nail.

It is general practice in the furniture industry to drive clamp or joint nails manually into matching pieces of wood previously prepared by having a complementing groove cut in each piece to accommodate the body portion of the nail. Such manual driving is, needless to say, costly and laborious. The use of these nails is difficult and time consuming due to their unusual shape. For this reason an attempt is often made to utilize some less satisfactory but more easily applied fastening device.

It is an object of the present invention to provide a new apparatus for driving a fastening device into two members and for holding the two members fixedly while another fastening device is being driven in.

Still another object is to provide a new apparatus for driving clamp nails or joint nails.

An additional object is to provide an apparatus for driving clamp nails or joint nails which may be adjusted to accommodate work pieces of different size.

Other objects will be apparent from the following detailed description taken in conjunction with the annexed drawings wherein.

Figure 1:
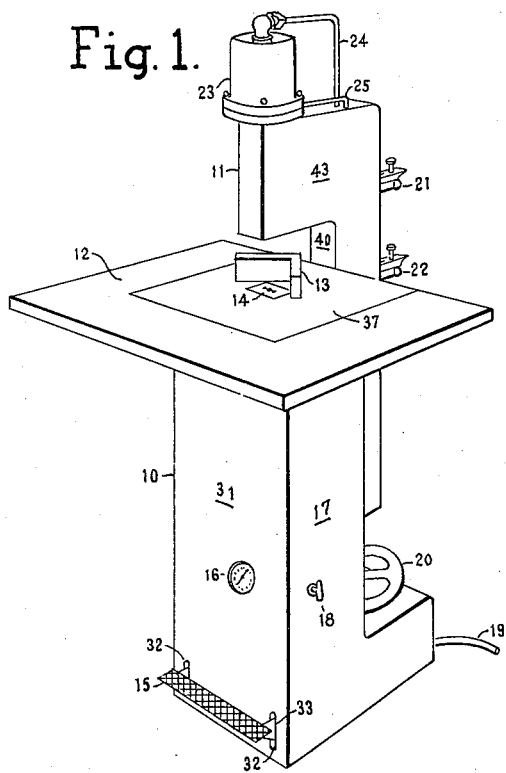
Figure 1 is a perspective view of one embodiment of a nail driving machine constructed according to the present invention.

Referring now to Figure 1, the machine is seen to comprise a lower enclosed portion 10, an upper enclosed portion 11 and a table extension 12 contiguous with work supporting table 37 which is disposed between the lower portion 10 and the upper portion 11. Mounted on table 37 is a metal form 13 for the purpose of positioning two pieces of wood to be fastened together by means of joint nails.

As will be more fully explained hereinafter, lower portion 10 and upper 11 each contain an element for driving joint nails. The terminal end of the metal guide blocks (Fig. 1) through which the joint nails are driven by the lower driving element is indicated with reference numeral 14. A pivoted foot pedal 15 extends forward from the bottom of the front panel 31 of lower enclosed portion 10. Mounted on panel 31 above foot pedal 15 is air gauge 16 for indicating air pressure on a supply conduit 19. Mounted on the side panel 17 of lower portion 10 is air regulator valve 18 to regulate the pressure on the air fed to the machine through air supply conduit 19.

As will be more fully explained below, the distance between upper enclosed portion 11 and supporting table 37 may be adjusted within certain limits so as to adapt the machine for driving nails into work pieces of varying dimensions. A hand wheel 20 is disposed at the rear of lower portion 10 to make such adjustment possible. At the back of the machine may be seen a feed mechanism indicated generally at 21 for supplying nails to the upper driving element and a feed mechanism 22 for supplying nails to the lower driving element. Mounted on the top of upper portion 11 is double-acting air cylinder 23. Air is supplied to the top of cylinder 23 through conduit 24. A second air conduit 25 is connected to the bottom of cylinder 23.

Figure 2:
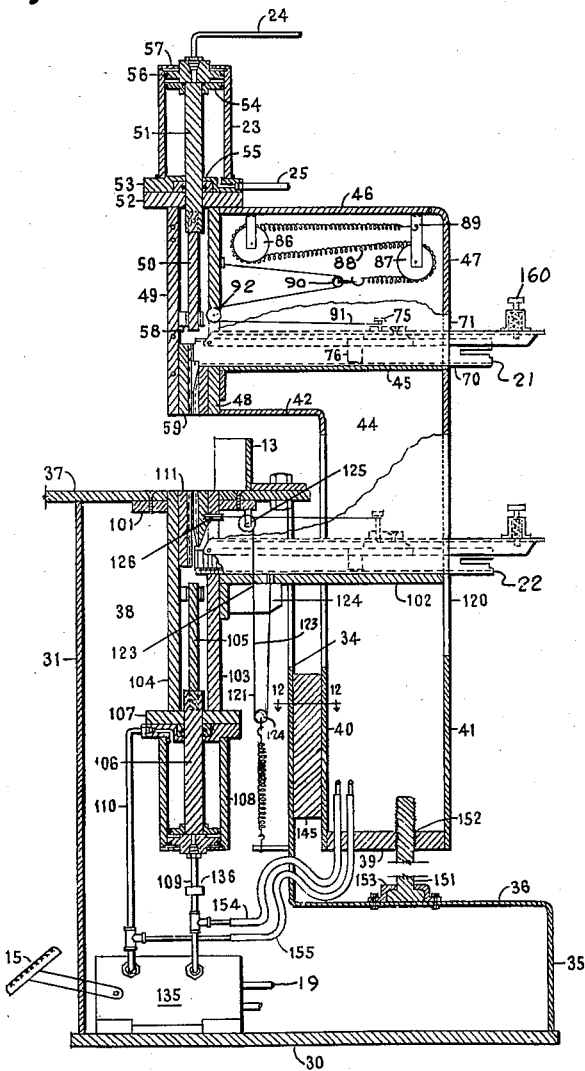
Figure 2 is a sectional view in elevation taken along the central vertical axis of the machine shown in Figure 1.

Referring now to Figure 2, a plate-like member 30 serves as a base for the housing which encloses the lower driving element and pneumatic system. Extending vertically upward from member 30 at the front of the machine is metal panel 31. Panel 31 is secured to base 30 by any suitable means. Openings 32 (shown in Figure 1) in the lower part of panel 31 accommodate the levers 33 on which foot pedal 15 is mounted. The back of the housing enclosing the bottom driving element and pneumatic system is defined by vertical panels 34 and 35 and horizontal portion 36 joining panels 34 and 35. Panel 35 is connected to base member 30 by any suitable means such as by welding. Panels 34, 35 and horizontal portion 36 may be, and preferably are, formed of a continuous sheet of metal.

Supported by front panel 31 and back panel 34 is metal work supporting table 37. Table 37 is attached to front panel 31 and back panel 34 by any suitable means. It will thus be seen that the stationary lower housing composed of base 30, panels 31, 34, 35, 36, table 37, side panel 17 (Figure 1) and an opposite side panel (not shown) encloses a space generally referred to with the reference numeral 38.

The upper driving element is fixedly mounted on a vertically adjustable framework to be described. This vertically adjustable framework comprises horizontal base member 39 disposed parallel to and in spaced relation from horizontal panel 36. Connected to member 39 are vertical front panel member 40 and vertical rear panel member 41. The upper portion of panel 40 is connected to a horizontal member 42, which may be, and preferably is, integral with panel 40. It will be noted that member 42 extends in spaced relation over the rearmost portion of table 37. The upper portion of panel 41, indicated with the reference numeral 47, connects with horizontal member 46 which extends parallel to and spaced above member 42. As seen more clearly in Figure 1, the just-described framework supports inverted L shaped side panel 43 and an opposing side panel (not shown) which act in conjunction with the framework to enclose the upper driving assembly in a space generally referred to in Figure 2 with the reference numeral 44. Side panel 43 and the opposing side panel (not shown) are rigidly secured to the framework comprised of members 39, 40, 41, 42, 46 and a vertical member 49 by any suitable means such as by screws.

A horizontal member 45 extends forward from member 41 to which it is connected in spaced relation between members 42 and 46. A vertical member 48 connects the two horizontal members 42 and 46 toward the front of the machine. Vertical member 48 is slotted to receive the upper feed magazine to be more fully described below. Horizontal member 45 is connected to member 48 by any suitable means. Another vertical member 49 is disposed parallel and in spaced relation to member 48 so as to define a rectangular cylinder in which upper driver 50 of piston rod 51 is free to reciprocate. Disc 52 serves the dual purpose of supporting cylinder 23 and helping to maintain vertical members 48 and 49 in spaced relation and is joined to each of these elements and to horizontal member 46 by any appropriate means such as by countersunk screws (not shown). Cylinder 23 rests on and is welded to cylinder base 53 which in turn is joined to supporting disc 52 by any suitable means such as by screws (not shown). Piston rod 51 of cylinder 23 is connected at its upper end to piston 54 and operates in a bearing 55 carried in base 53. The top of cylinder 23 is closed by means of a piston cap 56 held in a recess in the wall of cylinder 23 by means of snap ring 57. Sealing of piston 54, bearing 55 and piston cap 56 is effected by means of O rings. Upper driver 50 reciprocates in a bearing 58 mounted on the inside wall of vertical member 49.

Figure 5:
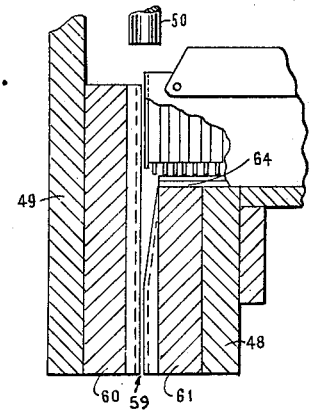
Figure 5 is an enlarged sectional view of a portion of the upper feed passageway and driving head shown in Figure 2.
Figure 6:
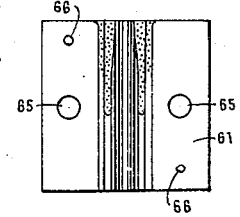
Figure 6 is a view in elevation of one of the guide blocks shown in Figures 4 and 5.

As previously explained, air is supplied to the top of double-acting cylinder 23 through conduit 24. Air conduit 25 is connected to the bottom of cylinder 23 by means of a duct in cylinder base 53. Beneath upper driver 50 and between vertical members 48 and 49 there is disposed a member 59 defining a passageway for joint nails and upper driver 50. Member 59 is secured to vertical members 48 and 49 and maintained in place by means of screws and dowel pins as shown in Figures 5–6. Further details of member 59 will be apparent from Figures 4–6 to which reference is now made.

Figure 4:
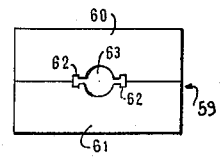
Figure 4 is an end view of a member defining a passageway for nails and the driving head of the machine.

As seen in Figure 4, member 59 is comprised of two opposing guide blocks 60 and 61 fitted together so as to define at their exit end a passageway 62 for joint nails. The central axis through passageway 62 is enlarged as shown at 63 so as to accommodate upper driver 50 for urging the nails through passageway 62. Guide block 60 is somewhat longer than guide block 61 so that when these two pieces are fitted together a shoulder 64 (Fig. 5) is formed to support the magazine and magazine housing carrying the nails.

The groove in block 60 is uniform throughout its length and will be of the character shown in Figure 4, i.e., a semicircular groove having a shallow channel on either side to accommodate the body portion of the joint nail and a deeper channel at the end of each shallow channel to accommodate the flange portions of the nail. The groove in block 61 is non-uniform throughout the length of the block. It will be seen from Figures 5 and 6 that the semicircular groove is uniform in depth throughout the length of block 61 but the channels on either side of the semicircular groove are bevelled toward the semicircular groove from a position about half-way down the block up to the shoulder portion 64. The grooves in the lower portion of block 61 are identical to the grooves throughout block 60 as described above and as shown in Figure 4. This structure results in an enlarged passageway at the point where the nails are first pressed out of the magazine by the upper driver 50. The enlarged passageway gradually converges into a restricted passageway of the form shown in Figure 4 to position the nail with precision and accuracy for the final driving operation. Guide block 61 is aligned with guide block 60 and both blocks are secured to members 48 and 49 by means of screws in openings 65 and dowel pins in openings 66 in block 61. Corresponding openings (not shown) are provided in guide block 60 and in members 48 and 49. This method of attachment has the advantage that the guide blocks may be easily removed from the machine for repair or replacement with guide blocks to accommodate different sized joint nails.

Figure 3:
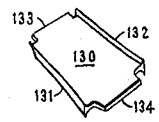
Figure 3 is a perspective view of a clamp nail or joint nail of the type capable of being driven by the machine of the present invention.

Figure 3 shows a clamp nail or joint nail of the type driven by the machine of the present invention. The nail comprises a flat body portion 130 having a sharp edge 134 adapted to be driven into the work pieces to be connected together. Along each side of body portion 130 there extends a rib or flared flange 131, 132. The nail is slightly wider at the end toward edge 134 than at the opposite end 133 so that when the nail is driven into two work pieces a clamping action is effectuated, drawing the work pieces tightly together. These nails are well known and widely used in the furniture industry. They are manufactured by the Clamp Nail Co., of Chicago, Illinois. The terms "clamp nail," "joint nail" and "nail" are interchangeably used herein to designate this type nail.

Figure 7:
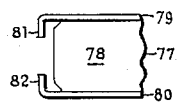
Figure 7 is a fragmentary view in elevation of the end of the upper feed magazine.
Figure 8:
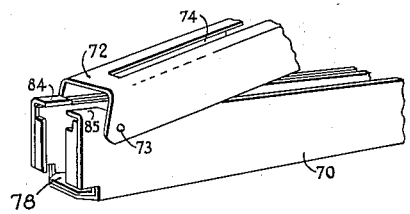
Figure 8 is a perspective view of a portion of the upper feed magazine of Figure 7 in place in its housing.

The mechanism used to feed nails to the upper driving assembly comprise a magazine housing 70 which is inserted through slot 71 in vertical frame member 47. Housing 70 is supported on horizontal member 45. Housing 70 is provided with a bottom, two side walls and a top 72 hinged near the forward end of housing 70 at the point 73. A slot 74 extends along the center axis of top 72 as shown in Figure 8. Slot 74 accommodates screw 75 (Figure 2) of nail follower 76. Follower 76 may be of any suitable shape such as a rectangular block adapted to fit in sliding relation within magazine 77 which is contained within housing 70. Magazine 77 (Figure 7) comprises bottom portion 78, side walls 79, 80, and has no top. At the forward end of magazine 77, lips 81, 82, are connected to walls 79, 80. As seen in Figure 7, lips 81, 82 are spaced forward of the bottom 78 a sufficient distance to permit passage in a downward direction out of the magazine 77 of a single nail and a portion of the driving head. The bottom of housing 70 at the forward end thereof is of the same general design as the bottom 78 at the forward end of magazine 77. The walls 79, 80 at the rear end of magazine 77 connect on each side with an extension such as the one shown at 83 in Figure 9. These extensions are used when inserting the magazine 77 into or withdrawing it from housing 70.

Connected to the sides of housing 70 forward of hinged top 72 are spaced horizontal lips 84, 85. When magazine 77 is in place in housing 70 as shown in Figure 8, the forward edge of lips 84, 85 are aligned with the forward edge of the bottom 78 of magazine 77. Lips 84, 85 serve to prevent nails near the exit end of the magazine 77 from being displaced and pulled up out of the magazine due to the reciprocating motion of the upper driver 50.

For applying tension to follower 76 there is provided freely rotatable pulleys 86, 87 mounted on member 46. Spring 88, one end of which is affixed to the housing at the point 89, applies tension to floating pulley 90. This tension in turn is transmitted to follower 76 through flexible wire strand 91 which is connected at one end to vertical member 48 and at the other end to screw 75. Strand 91 passes over pulley 90, and then over pulley 92 mounted in a recess in vertical member 48 and then to screw 75 of follower 76. It will thus be apparent that when follower 76 is in the position shown in Figure 2, for example, the action of spring 88 working through pulleys 90 and 92 will tend to urge follower 76 toward the left.

The lower nail driving assembly enclosed within lower portion 10 has parts which correspond in function and generally in structure with those described above for the upper nail driving assembly, the principal difference being that the lower assembly is adapted to drive nails in an upward direction. The lower driving assembly is supported by means of a framework comprising supporting plate 101, a lower horizontal member 102, and a vertical member 103. Vertical member 103 extends through suitable openings in plate 101 and table 37. A second vertical member 104 is disposed parallel and in spaced relation to member 103 to define a rectangular cylinder for lower driver 105 carried by lower piston rod 106. Supporting plate 101 is attached to table 37 by means of screws and vertical members 103, 104 are attached to plate 101 by any suitable means such as by welding. Horizontal member 102 is similarly attached to vertical member 103. Disc 107 serves the dual purpose of supporting lower double-acting cylinder 108 and helping to maintain members 103, 104 in spaced relation. Disc 107 is joined to each of these members by appropriate means such as by welding. Cylinder 108 and its related parts are similar in structure to the arrangement in upper cylinder 23. Double-acting cylinder 108 may be, and preferably is, slightly weaker in driving action than upper cylinder 23. This may optionally be accomplished by making cylinder 108 and related parts slightly smaller than the upper cylinder and its parts. Air is supplied to the bottom of cylinder 108 by conduit 109 and air conduit 110 is connected to the top of cylinder 108.

Above lower driver 105 between vertical members 103, 104 there is disposed a member 111 similar in structure to previously described member 59 which defines a passageway for joint nails and the lower driver 105. The two pieces which together make up member 111 are connected together and to members 103, 104 by any suitable means such as by screws and dowel pins (not shown) as previously described in connection with Figure 6.

Figure 9:
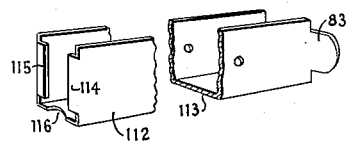
Figure 9 is a perspective view of the lower feed magazine.
Figure 10:
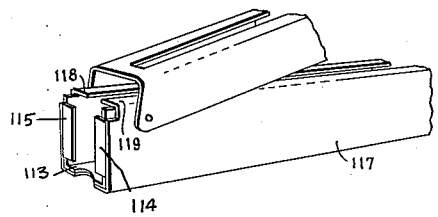
Figure 10 is a perspective view of a portion of the lower feed magazine of Figure 9 in place in its housing.

The lower magazine and magazine housing are shown in Figures 9–10. The magazine 112 is similar in structure to upper magazine 77 with the exception that the bottom 113 of magazine 112 extends nearer to the inwardly turned vertical lips 114, 115 so as to preclude the possibility of a nail falling down out of magazine 112. A semicircular notch 116 in the bottom 113 of magazine 112 accommodates lower driver 105 and permits it to displace a single nail at a time when it advances in an upward direction.

Lower magazine housing 117 is similar to upper magazine housing 70 with the exception that the bottom thereof has the same general configuration as the bottom of magazine 112 just described, including a semicircular notch. The horizontal lips 118, 119 are located on the housing 117 a sufficient distance away from the front edge of housing 117 (or from lips 114, 115 when magazine 112 is in place) to permit nails to be urged out of magazine 112 in an upward direction by lower driver 105.

Lower magazine housing 117 is inserted in lower portion 10 through elongated slot 120 in panel 41 and is supported in place by horizontal member 102. Member 102 is attached to vertical members 34 and 103 by appropriate means. Tension on the follower in magazine 112 is obtained by the action of spring 121 anchored to the vertical wall 34 and is transmitted to the follower via flexible strand 123 operating in floating pulley 124 and pulleys 125, 126. That is, when the follower in magazine 112 is withdrawn to the right, spring 121 is extended. In this condition spring 121 constantly tends to return to its normal unextended condition and thus exerts a downward pull on flexible strand 123, which in turn pulls the follower to the left, as shown in Fig. 2.

To load the magazine with nails, housing 70 is inserted through slot 71 in vertical member 47 and pushed forward along horizontal member 45. Follower 76 is set in place inside housing 70 and drawn toward the rear of housing 70 until the follower assembly is arrested and held by a spring loaded pin 160 shown mounted at the rear of top 72 of housing 70. Pin 160 is adapted to intercept a corresponding indentation in the top of the follower assembly, thus locking the assembly in place underneath pin 160. In this condition, of course, spring 88 is extended and tends to urge follower 76 toward the left in Figure 2. Hinged top 72 is then opened and magazine 77 containing a supply of joint nails is placed in housing 70. The joint nails may be, and preferably are, loosely attached to each other such as by means of a glue or shellac, although individual nails may be used to load the magazine. The top 70 is then lowered, and the follower 76 is released by lifting up on the spring loaded pin 160. In this way follower 76 is permitted to move to the left (in Figure 2) until it contacts the last nail in magazine 77. Follower 76 is now urging the supply of nails under mild pressure to the left toward the upper driver and as soon as a clamp nail is driven, follower 76 moves the supply of nails further toward the left to bring another nail into position under the upper driver.

The lower magazine is loaded in similar manner, the outstanding difference being that the nails are placed in magazine 112 in an inverted position to permit them to be driven in an upward direction.

Figure 11:
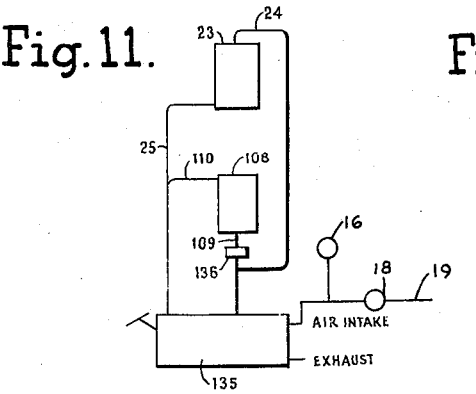
Figure 11 is a schematic view of the pneumatic system used in the present invention.

The pneumatic system utilized in the present invention is shown schematically in Figure 11. Upper double-acting air cylinder 23 is served by conduits 24 and 25 and lower double-acting air cylinder 108 is served by conduits 109 and 110. Air is supplied from any suitable source via an air regulator valve 18 (Figure 1) to foot operated four-way valve 135. A pressure of around 60 p.s.i. has been found to operate very satisfactorily. Valve 135 may be of any suitable design constructed so that when the foot pedal 15 (Figure 1) is actuated, air flows to one of the supply conduits connected to the valve and exhausts from the other conduit. Releasing the foot pedal reverses the action. Such valves are well known in the art. A valve found to be particularly useful in the operation of the present machine is manufactured by A. Schrader's Son, Division of Scovill Manufacturing Co., Inc., Brooklyn 38, N.Y., and described in their catalog No. 15 as the Schrader four-way balanced poppet type valve.

It will be noted that there is connected in the air conduit 109 serving the lower cylinder 108 a flow control valve designated with numeral 136. The purpose of valve 136 is to reduce the speed of the lower piston slightly compared to the upper piston so the upper cylinder will complete its driving action before the lower cylinder does. A particularly suitable valve for this flow control function is manufactured by the above mentioned A.

Schrader's Son and designated as their No. 3250 series. Such valves are well known to those skilled in the art.

Operation of the system is as follows: Upon pressing down foot pedal 15, air under suitable pressure flows from valve 135 through conduit 24 to drive the piston in upper cylinder 23 downward; a moment or so later air flowing through control valve 136 and conduit 109 drives the piston in lower cylinder 108 upward. During these operations, air is exhausted from the upper and lower cylinders via conduits 25 and 110, respectively. Upon releasing foot pedal 15, air under pressure is simultaneously supplied to cylinders 23 and 108 via conduits 25 and 10, respectively. This results in both pistons being simultaneously retracted while air from the cylinders is exhausted through conduits 24 and 109.

In view of the delayed action of lower cylinder 108, the upper driver 50 is permitted to drive a clamp nail down into the work pieces and come to rest in contact with the work pieces holding them in place during the time that lower driver 105 drives a second nail upwardly into the work pieces from the opposite side.

Figure 12:
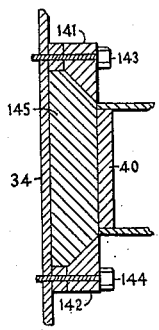
Figure 12 is a section view taken along the lines 12—12 of Figure 2.

The means by which the distance between upper enclosed portion 11 and supporting table 37 may be adjusted will now be explained, with reference to Figures 2 and 12. As seen in Figure 12, the vertical front panel member 40 of the framework supporting the upper driving assembly is connected to a vertically disposed bar 145 with sloping shoulders. Bar 145 may be firmly attached to member 40 by any suitable means (not shown) such as by screws. Bar 145 is disposed in sliding relation within a passageway defined by a pair of vertical members 141, 142 having sloping shoulders matching the sloping surfaces of bar 145. Members 141, 142 are secured to the immovable back panel 34 of the housing enclosing the bottom driving element by any suitable means such as screws 143, 144. It will thus be apparent that bar 145 may be vertically moved with respect to the housing enclosing the bottom driving assembly; since panel 40 of the framework carrying the upper driving assembly is connected to bar 145 panel 40 together with the upper driving assembly may be likewise vertically moved. The means by which this movement is accomplished will now be described.

As seen in Figure 1, a hand wheel 20 is disposed at the rear of lower portion 10. Hand wheel 20 is affixed to a threaded shaft 151 (Figure 2) which extends through a threaded opening 152 in horizontal base member 39 of the vertically adjustable framework carrying the upper driving element. The enlarged end portion of shaft 151 is enclosed in rotatable relation within a journal box 153. Journal box 153 is secured to horizontal panel 36 of the stationery lower housing by means of screws. It will thus be apparent that when hand wheel 20 is turned, shaft 151 will be rotated and the threaded portion thereof, operating in threaded opening 152 of member 39, will cause the entire framework carrying the upper driving assembly to be raised or lowered, depending on the direction of rotation. Any suitable means (not shown), may be provided for locking the hand wheel 20 in place when the upper portion 11 is in any particular position with respect to table 37. It will be noted that appropriate slots, such as the one shown at 120, are provided in the movable framework to accommodate the lower nail magazine assembly and related structure when this adjustment is being made. Sections of flexible conduit 154, 155 passing through suitable opening in panel 34 permit the just described vertical adjustment to be accomplished without interfering with the supply of air to conduits 24, 25 with which flexible conduit 154, 155 are connected.

The manner in which the machine is operated is fairly apparent from the foregoing description. An appropriate source of high pressure air is connected to valve 135. The magazines are loaded with nails and the distance between upper enclosed portion 11 and table 37 is adjusted so that there is just sufficient clearance for the work pieces to be inserted between the two driving heads. The work pieces are then placed against form 13 so as to be positioned with the pre-cut grooves in the work pieces disposed opposite the nail passageways in the members 59 and 111.

Foot pedal 15 is then pressed down. This results in upper driver 50 immediately driving a nail down into the work pieces. The end of upper driver 50 contacts the work pieces with the result that the work pieces are held in a fixed position. At this time, the lower driver 105, slightly delayed in action by flow control valve 136 moves upward driving a nail from the bottom magazine into the bottom side of the work pieces being held in place by the upper driver 50. The foot pedal 15 is then released, withdrawing the two drivers, the nailed-together work pieces are removed and the machine is ready to repeat the operation.

While a preferred embodiment of the invention has been shown and described, various changes and modifications will occur to those skilled in the art without departing from the scope or spirit of the invention as defined in the appended claims.

What I claim is:

1. Apparatus for fastening two pieces together by inserting joint nails therein comprising in combination means for supporting said pieces in position for fastening, a first reciprocative member acting in opposition to said supporting means, means for feeding joint nails to said first member, a second reciprocative member acting oppositely with respect to said first member, means for feeding joint nails to said second member, and means for causing said first member to drive a joint nail into one side of said pieces and hold said pieces in a fixed position on said supporting means while said second member is driving a joint nail into the opposite side of said pieces.

2. Apparatus for driving joint nails comprising a lower housing formed for supporting work pieces thereon, a first driving element contained within said lower housing for driving a joint nail in an upward direction into work pieces supported on said housing, an upper housing, a second driving element aligned with said first driving element and contained in said upper housing for driving a joint nail in a downward direction, means to cause said second driving element to drive a joint nail into a pair of work pieces supported on said lower housing and remain in clamping contact therewith while said first driving element is subsequently caused to drive a joint nail into the opposite side of said pieces, and means for adjusting the distance between said upper housing and said lower housing.

3. Apparatus for driving joint nails comprising in combination a lower housing formed for supporting work pieces thereon, first means contained within said lower housing for driving a joint nail upwardly into work pieces supported thereon, means to supply joint nails to said first means, an upper housing, second means contained within said upper housing for driving a joint nail downwardly in a vertical plane intercepting said first means, means to supply joint nails to said second means, and means for raising or lowering said upper housing with respect to said lower housing.

4. Apparatus for driving joint nails comprising in combination a first fluid actuated piston acting vertically for driving a joint nail upwardly, a second vertically acting fluid actuated piston aligned with said first piston for driving a joint nail oppositely downward, a work supporting table disposed horizontally between said first and second pistons, and means for controlling the actuation of said pistons so that said second piston acts to hold work in a fixed position on said table during the time that said first piston drives a joint nail.

5. Apparatus for driving joint nails comprising in combination a work supporting table, a first double acting air cylinder arranged below said table for driving a joint nail upwardly into work supported thereon, a second double acting air cylinder arranged above said table in alignment with said first cylinder for oppositely driving a joint nail downwardly into work supported thereon, and means for actuating said cylinders consecutively to cause said second cylinder to drive a joint nail into said work first and then serve to hold the work in fixed position on said table while said first cylinder is caused to drive a joint nail oppositely into said work.

6. Apparatus for driving joint nails having two flanged portions separated by a body portion into two work pieces comprising in combination a work supporting table, a first driving element powered for driving a joint nail upward in a vertical plane and into work supported on said table, a first guide member having a first opening therein adapted to permit said first driving element to pass therethrough and having two additional openings therein adapted to permit the flared flanges of a joint nail to pass therethrough, said additional first guide member openings merging into said first opening, a second driving element powered for driving a joint nail downward in said vertical plane and into work supported on said table, a second guide member having a first opening therein adapted to permit said second driving element to pass therethrough and having two additional openings therein adapted to permit the flared flanges of a joint nail to pass therethrough, said additional second guide member openings merging with said first opening, and means for actuating said powered driving elements consecutively with said second driving element acting first to drive a joint nail into said work and then serving to hold the work in fixed position on said table while said first driving element acts to drive a joint nail oppositely into said work.

7. Apparatus for driving joint nails having two flanged portions separated by a body portion comprising in combination a work supporting table, a reciprocative driving element acting in opposition to said table, a guide assembly having a first channel adapted to accommodate said driving element for reciprocation, having a second generally parallel channel adapted to accommodate one flange of a joint nail, having a third generally parallel channel adapted to accommodate the other flange of said joint nail, and having a fourth channel interconnecting said first channel with said second and third channels and adapted to accommodate the body portion of said joint nail, means to supply joint nails to said guide assembly, and means to actuate said driving element for driving a joint nail through said guide assembly into work supported on said table.

8. Apparatus for driving joint nails having two flanged portions separated by a body portion comprising in combination a horizontally disposed work supporting table, a fluid actuated reciprocative driving element acting in opposition to said table, a guide assembly having a first channel adapted to accommodate said driving element for reciprocation, having a second generally parallel channel adapted to accommodate one flange of a joint nail, having a third generally parallel channel adapted to accommodate the other flange of said joint nail, and having a fourth vertical channel disposed normal to said second and third channels and interconnecting said first channel with said second and third channels and adapted to accommodate the body portion of said joint nail, means to supply joint nails to said guide assembly, means to actuate said driving element for driving a joint nail through said guide assembly into work supported on said table, and means to adjust the distance between said guide assembly and said work supporting table.

9. Apparatus for driving joint nails having two flanged portions separated by a body portion comprising in combination a horizontally disposed work supporting table; a first driving element supported below said work table and powered for driving a joint nail upward in a vertical plane and into work supported on said table; a first guide member having a first vertical channel adapted to accommodate said first driving element, having a second vertical channel adapted to accommodate one flange of a joint nail, having a third vertical channel adapted to accommodate the other flange of said joint nail, and having a fourth channel interconnecting said first channel with said second and third channels and adapted to accommodate the body portion of said clamp nail; means to supply clamp nails to said first guide member; a second driving element supported above said work table and powered for driving a second clamp nail downward in said vertical plane and into work supported on said table; a second guide member having a first vertical channel adapted to accommodate said second driving element, having a second vertical channel adapted to accommodate one flange of said second joint nail, having a third vertical channel adapted to accommodate the other flange of said second joint nail, and having a fourth vertical channel interconnecting said first channel with said second and third channels and adapted to accommodate the body portion of said second joint nail; means to supply joint nails to said second guide members; and means for adjusting the vertical distance between said second drive member and said work supporting table.

10. Apparatus for driving joint nails having two flanged portions separated by a body portion comprising in combination a work supporting table, a reciprocative driving element acting in opposition to said table, a guide assembly having a first channel adapted to accommodate said driving element for reciprocation, having second and third generally parallel channels spaced respectively at each side of said first channel and adapted to accommodate the respective flanged portions of said joint nails, and having a fourth channel interconnecting said first channel with said second and third channels and adapted to accommodate the body portion of said joint nails transversely of said first channel, means acting laterally of the reciprocative path of said driving element to supply joint nails successively to said guide assembly in driving alignment with said second, third and fourth channels and transversely of said first channel, and means to actuate said driving element reciprocatively in the fourth channel of said guide assembly for driving joint nails supplied successively by said first mentioned means through said second, third and fourth channels into work supported on said table.

References Cited in the file of this patent
UNITED STATES PATENTS

| | | |
|---|---|---|
| 292,842 | Nevius | Feb. 5, 1884 |
| 312,550 | Brock | Feb. 17, 1885 |
| 543,204 | Ivins | Oct. 22, 1895 |
| 1,409,419 | Signell | Feb. 14, 1922 |
| 2,080,462 | Cranston | May 18, 1937 |
| 2,087,668 | Heller | July 20, 1937 |
| 2,217,894 | Ederer | Oct. 15, 1940 |
| 2,224,599 | Hingston | Dec. 10, 1940 |
| 2,330,575 | Grauding | Sept. 28, 1943 |
| 2,401,840 | Olson | June 11, 1946 |
| 2,448,801 | Cranston | Sept. 7, 1948 |
| 2,631,283 | Cranston | Mar. 17, 1953 |